United States Patent [19]

Shirai et al.

[11] Patent Number: 5,002,719
[45] Date of Patent: Mar. 26, 1991

[54] METHOD OF MAKING A PLASTIC DUST BOOT WITH RIDGES WHICH PREVENT END DEFORMATION DURING BLOW MOLDING

[75] Inventors: Tadayoshi Shirai, Hamamtsu; Masaji Yamamori, Nagoya, both of Japan

[73] Assignee: Ishikawa Tekko Kabushiki Kaisha, Tokyo, Japan

[21] Appl. No.: 450,391

[22] Filed: Dec. 14, 1989

[30] Foreign Application Priority Data

Dec. 28, 1988 [JP] Japan ............................ 63-332023

[51] Int. Cl.$^5$ ...................... B29C 49/02; B29C 49/36
[52] U.S. Cl. ................................. 264/537; 264/506; 264/523; 264/540; 425/525
[58] Field of Search .............. 264/523, 506, 507, 537, 264/538, 540, 533; 425/533, 525

[56] References Cited

U.S. PATENT DOCUMENTS 4,852,891 8/1989 Sugiura et al. ................... 264/506

FOREIGN PATENT DOCUMENTS 61-249737 11/1986 Japan ................... 425/533

Primary Examiner—Jan H. Silbaugh
Assistant Examiner—Catherine Timm
Attorney, Agent, or Firm—Morrison Law Firm

[57] ABSTRACT

A method for providing a dust-proof boot for a protruding equipment shaft of the type including a pair of spaced apart annular grooves. The boot includes an expandable central belly portion, a pair of restricted diameter attachment ring portions adapted to be received in the shaft grooves, and a pair of connecting portions connecting the attachment ring portions to the belly portion. It is formed by first forming a parison on a male die. The parison includes preformed attachment ring portions and connecting portions, at least one of which includes an inwardly protruding annular ridge member which is received in a mating recess in the die. The parison and the male die are inserted into a female blow-molding, die, with the preformed attachment ring portions and connecting portions caught and supported between the male and female dies. The belly portion of the boot is next formed by blow molding, during which step the ridge members are urged into sealing relation with wall portions of the male die grooves, thus preventing distortion of the preformed attachment ring portions.

2 Claims, 5 Drawing Sheets

METHOD OF MAKING A PLASTIC DUST BOOT WITH RIDGES WHICH PREVENT END DEFORMATION DURING BLOW MOLDING

BACKGROUND OF THE INVENTION

1. Field of the Invention

The present invention relates to a dust boot made of thermoplastic synthetic resin by means of blow molding, the dust boot having ring portions at opposite ends thereof by means of which it is attached in protective mounting on a component to be protected such as an automobile ball joint. The portion of the boot between the attachment ring portions is formed into the shape of an accordion or bell. The invention also relates to a method for making such a dust boot.

The dust boots referred to herein include dust boots for ball joints used in the automobile industry and the machine industry for steering rack boots, constant velocity joint boots and soon.

2. Description of the Prior Art

Conventional dust boots and methods of making them are explained hereafter, taking as an example, the rack boot shown in FIG. 10, which boot is made in an elastic accordion shape and is used for protectively covering an automobile rack and pinion steering mechanism.

Many dust boots of the above kind are made of rubber, e.g., a rubber of the chloroprene group. However, in order to improve product moldability, heat resistance, cold resistance, shock resistance against impact with gravel, etc., these boots are now being made from a thermoplastic resin. Such can be a thermoplastic elastomer of any one or more of the polyolefin, polyurethane, polyester, polyvinyl chloride, and polyamide groups. (Resins such as those mentioned above are hereinafter generally referred to simply as "resin".) Conventional methods of molding these resin dust boots, include an extrusion blow molding method, which involves wrapping an extruded cylindrical resin parison with a metal cavity mold for blow molding. The parison is then expanded by blowing compressed air therein to press the parison against the inner surface of the cavity and to thus obtain a molded piece also, an injection blow molding method can be used, which involves molding of a parison by injecting resin through an injection molding cylinder to the space between a cavity metal mold and a core metal mold, moving the parison together with the core metal mold to a blow molding cavity mold and closing the mold around the parison. The parison is then expanded by blowing compressed air into it for pressing it against the inner surface of the cavity.

As shown in FIG. 10, the size of the attachment ring portions at both ends of dust boot 1, especially the inner circumference of attachment ring portion 2 with the smaller diameter, is, in a typical case, made slightly smaller than the diameter of the locking groove part 4 of receiving shaft 3. This is so that there can be an interference fit between the attachment ring and receiving shaft thereby to securely attach ring portion 2 in locking groove 4. This secure attachment is intended to provide sealing effective to prevent dust and muddy water from entering the boot. In order to further improve sealing ability, it is general practice to form a protruding lip on the inner surface of attachment ring portion 2. The attachment ring portion 2 is formed, in case of the extrusion blow molding method, by means of compression molding, which involves sandwiching the parison between the core metal mold and the cavity metal mold, thereby limiting the inner diameter thereof, and thus forming attachment ring portion 2. On the other hand, in case of injection blow molding, attachment ring portion 2 is molded by injection molding between the cavity metal mold and the core metal mold when forming the parison. At the time of blow molding, the accordion shaped portion 5 molded, while limiting the inner diameter of the attachment ring portion 2, which is positioned between the cavity metal mold and the core metal mold without any space in between.

The conventional method of molding attachment ring portion 2 presents a problem in that, when accordion portion 5 is formed by blow molding the parison in the cavity metal mold. The part of attachment ring portion 2 which connects to accordion shaped portion 5, is stretched towards accordion portion 5, allowing compressed air, at a pressure typically between 4 and 7 $kg/cm^2$, to flow past the inner side of attachment ring portion 2. This impairs the measurement accuracy of the inner surface of attachment ring portion 2 and makes it difficult to so form vertical wall portion 7, which bends outwardly radially from inner end portion 6 of attachment ring portion 2 and substantially perpendicular to the attachment ring axis. In other words, with conventional practice it is difficult to form the inner end portion 6 into a sharp-angled shape. Unless inner end portion 6 is of a sharp-angled shape, locking of the inner end portion 6 with locking surface 4a at one end of locking groove 4 becomes weak when attaching the attachment ring portion 2 to the locking groove 4. This causes the inner end portion to easily come out of the locking groove. Moreover, if the measurement, i.e., diameter of the inner surface of attachment ring portion 2 is not accurate, in addition to making it difficult to obtain good sealing ability, this diameter error permits play between the width of attachment ring portion 2 and the width of locking groove 4. This in turn allows for slippage in the direction of receiving shaft 3 at the time of extension and contraction of the dust boot 1. Wear of the inner surface of attachment ring portion 2 and further impairment the sealing ability results.

OBJECTS AND SUMMARY OF THE INVENTION

In view of the above problems of the conventional art, an object of the present invention is to provide a dust boot made of synthetic resin wherein the attachment ring portion thereof locks securely in the locking groove of the receiving shaft and good sealing is obtained. For this purpose the present invention offers as another object, a method of molding a synthetic resin dust boot which makes it possible to prevent blow molding compressed air from flowing past the inner side of the attachment ring portion during molding. This makes it possible to form easily the inner end portion of the attachment ring into an accurate sharp-angled shape without deforming the inner end.

Briefly stated, there is provided a flexibly structured, synthetic resin dust boot for protectively covering mechanical components such as an automobile rack and pinion steering mechanism joint to keep dirt etc. away from the joint moving parts, the boot has spaced apart encircling collars with a central boot body of enlarged character exending between these collars. The collars are received on or attached to locking grooves formed on the components. The central body part can be accordion-pleated, bell-shaped etc. Wall parts are formed extending radially, perpendicularly outward from the collars. These wall parts have a sharp-angle corner profile for catching engagement with catching surfaces on the locking grooves and serve to insure positive, highly tight sealing of the collars to the locking grooves and hence of the boot interior. One or more continuous ridge is formed on each wall part or on a sleeve part which joins the collar to the central body part. These ridges, when the boot is installed on the component joint, directly contact surfaces on the component to further enhance the degree of boot sealing.

The boot is made by injection blow molding or by extrusion blow molding and the molds used are provided with grooves to form the ridges so that in the first part of the making the ridges will already be produced before the blow molding step is initiated and their presence can be utilized to prevent blow molding air from passing behind the collars in the mold and contacting the collar inner surfaces since such air contact causes deviation in the intended internal dimensions of the collars. The ridges, in preventing air flow to the inner surface side of the collars, serve to prevent such air flow against the collars as causes deformation of the sharp-angle corner profile of the wall parts, a condition which is undesirable since it leads to loosening of the collars on the components attaching surfaces.

In accordance with these and other objects of the invention, there is provided a dust boot for protectively covering a joint defined by a juncture of first and second mechanical components, the mechanical components having locking groove surfaces thereon, the locking groove surfaces having catching surface parts thereon. The boot has an elongated body which has encircling collars at each end thereof and an enlarged envelope central body extending between the collars. Wall parts extend outwardly from each collar at locations distal the ends of the boot and sleeve parts extend from each collar to joinder with the central body part. Ridge means are associated with each collar and are carried on the wall parts or on the sleeve parts or a combination of such. The collars are received on the locking groove surfaces of the mechanical components for attaching the boot in covering position over the joint. The wall parts each have inner ends of sharp-angle profile so that they can engage the catching surface parts of the associated locking surfaces when the collars are received on such locking surfaces.

According to a further feature of the invention there is provided an improved method of making the dust boot from synthetic resins in which a resin parison is formed in a molding unit die and such that encircling collars are formed on each end of the parison. The improved method requires that continuous encircling grooves be formed in the structure of the die adjacent the die region where the encircling collars are formed so that during parison formation, the die structure grooves form correspondingly shaped continuous ridges adjacent the formed collars. With the formed ridges still present in the grooves, the parison body between the collars is blow molded to give it its final shape, but during that blow molding, the presence of the formed ridges in the grooves blocks passage of any blow molding air to the inner surface of the collars to prevent deviation of collar intended dimension.

The present invention aims to fulfill the above mentioned objects and, accordingly, synthetic resin dust boot 11 of the present invention is made from thermoplastic synthetic resin, being shaped by means of blow molding and has attachment ring portions 13 and 14 at opposite ends of a boot belly portion 12 formed into an accordion or bell-like shape. The attachment ring portions 13 and 14 are intended to be received on and attached to locking grooves 17 and 19 of receiving shafts 16 and 18 respectively such attachment being effected with a tight or interference fit between the parts one or more ringed or continuous length ridges 24, 26 and 35 can be formed on the inner surface of radial wall portions 22 and 32, which respectively bend outwardly from inner end portions 21 and 31 of the attachment ring portions 13 and 14, and on the inner surface of sleeve portions 23 and 33, which respectively stretch from the wall portions 22 and 32 and connect to the boot belly portion 12. The inner end portions 21 and 31 of the attachment ring portions 13 and 14 it will be noted are formed into a sharp-angled shape substantially vertical, that is, perpendicular to the ring portion axis.

The method of making a synthetic resin dust boot according to the present invention when producing the synthetic resin dust boot 11 from thermoplastic resin by means of blow molding, includes forming concavity groove 52 and 59 in core metal molds 43 used for molding the attachment ring portions 13 and 14 so that ridges 24, 26 and 35 are formed on the respective inner surface of radial wall portions 22 and 32 and on the inner surfaces of sleeve portions 23 and 33. Then, at the time of molding a parison or closing of the molds for blow molding, ridges 24, 26 and 35 are molded together with the attachment ring portions 13 and 14. One or more of such ridges can be formed at each of the depicted ridge locations. Next, blow-molding of the belly portion 12 is carried out with the attachment ring portions 13 and 14 and sleeve portions 23 and 33 during that procedure, being sandwiched between molding members 48, 49, 50 and 51.

In the synthetic resin dust boot 11 of the present invention, attachment ring portions 13 and 14 are, respectively, attached to locking grooves 17 and 19 of receiving shafts 16 and 18. When attachment ring portions 13 and 14 are thus attached, their inner end portions 21 and 31, each formed into a sharp-angled shape substantially radial to the axial direction, are securely caught in associated locking grooves. Thus one end 17a of locking groove 17 catches inner end portion 21, and one end 19a of locking groove 19 catches inner end portion 31. This insures that attachment ring portions 13 and 14 are securely locked so as not to accidentally come off the component being protected and maintaining close sealing between, e.g., receiving shafts 16 and 18 and attachment ring portions 13 and 14. Further, because of the catching action of inner end portions 21 and 31 with ends 17a and 19a of locking grooves 17 and 19, the technician or mechanic is able to feel and therefore to confirm completion of the attachment of attachment ring portions to the locking grooves. Sealing ability will be further improved, if ridges 24, 26 and 35 formed on the respective inner surfaces of vertical wall portions 22 and 32 and on the inner surfaces of sleeve portions 23 and 33, come into contact with surfaces 16a and 18a of receiving shafts 16 and 18.

In making the synthetic resin dust boot of the present invention, molding ridges 24, 26 and 35 are molded by means of concavity grooves such as 52 and 59 of core metal mold 43. Metal mold 43 also is used for molding attachment ring portions 13 and 14 at the time of molding a parison or when closing the molds for the blow molding. Belly portion 12 is formed by blow molding, with attachment ring portions 13 and 14 and sleeve portions 23 and 33 being sandwiched between molding members 48, 49, 50 and 51. At this time, because of locking of ridges 24, 26 and 35 with concavity grooves 52 and 59 of core metal mold 43, compressed air blown to the space between parison 57 and core metal model 43 is prevented from flowing at or past the inner side of attachment ring portions 13 and 14. Therefore, inner end portions of 21 and 31 are maintained substantially perpendicular to the axial direction and retain their sharp-angled formed shape, and deviation from intended inner circumference dimension of the attachment ring portions is prevented.

DETAILED DESCRIPTION OF THE PREFERRED EMBODIMENT

Figure 8:
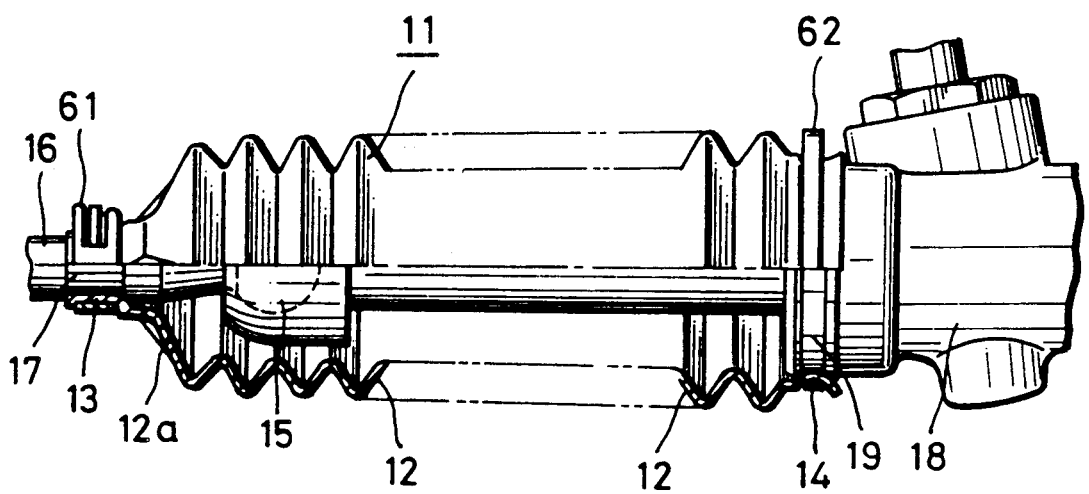
FIG. 8 is a side view partly in full lines and partly in section showing the dust boot in the attached condition on a mechanical component to be protected therewith.

The illustration of preferred embodiments of the present invention will be described hereunder referring to the attached drawings FIG. 1 through FIG. 9:

Dust boot 11 is a rack boot to be used for protecting a mechanical component such as an automobile rack and pinion type steering mechanism as shown in FIG. 8 to prevent dust, road debris etc from entering the component joint.

The dust boot 11 is an elongated member having encircling collars 13 and 14 at the opposite ends thereof, these collars or attachment ring portions being the means by which the boot is attached in place on the steering mechanism joint. Collar 13 is received on the locking groove 17 of joint shaft 16, and collar 14 is received on locking groove 19 of rack housing 18. The collars merge with, and are joined to, the member enlarged, encircling central body or belly part 12, this part being of pleated accordion, bell-shape or similar configuration. Collar 14 in this particular instance is of larger diameter than collar 13 but the respective diameters will be determined by a given application, the only constant being that the inner diameter of each will be slightly smaller than its associated receiving locking groove so that tight interference fit between these elements can be achieved. The respective collars have radial outwardly directed wall parts 22, 31 which extend substantially perpendicular to the collar axes and the inner coners of each, that is, where they set in the locking grooves are of well-defined, sharp-angled profile or shape for reasons as will be given later on. The radial wall parts merge with respective sleeve parts 23, 33 and these, in turn, are joined to the central body part 12. Continuous, encircling ridges 24, 26 and 35 are formed on the radial wall parts or the sleeve parts and serve the function, inter alia, of effecting a more enhanced sealing of the boot to the mechanical components with which it is used.

Attachment ring portion 13 with the smaller diameter measurement is as indicated above formed at one of the elastic belly portion 12 and attachment ring portion 14 with the larger diameter measurement is formed at the other end. The attachment ring portion 13 diameter is to be attached to locking groove 17 of joint shaft 16, which extends from ball joint 15 and acts as the receiving shaft, while attachment ring portion 14 is to be attached to locking groove 19 of the other receiving shaft, i.e. rack housing 18.

Figure 1:
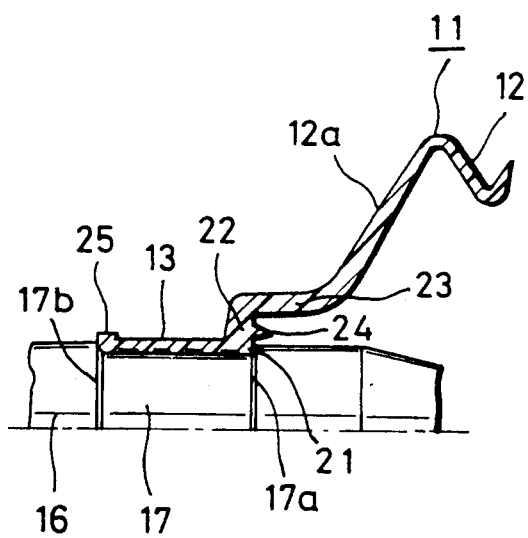
FIG. 1 is a half-sectional view showing the principal part of a first embodiment of the small diameter attachment ring portion of the dust boot of the present invention.

Next, detailed explanation of the part of the first embodiment concerning the attachment ring portion 13 will be given hereunder referring to FIG. 1.

As in conventional dust boots, the inner surface of the attachment ring portion 13 has the same or slightly smaller diameter than that of joint shaft 16 at the locking groove 17 so that the inner surface thereof should be pressed tightly against the surface of the locking groove 17. The width of the attachment ring portion 13 is slightly smaller than that of the locking groove 17 so that attachment ring portion 13 will be able to securely contact the locking groove 17. Further, the inner surface of the attachment ring portion 13 is formed with a notched configuration.

Circular vertical or radial wall portion 22 is formed from inner end portion 21 of the attachment ring portion 13, being bent outwardly in the radial direction. Sleeve portion 23 extends from the vertical wall portion 22 to accordion-shaped portion 12. Inner end portion 21 of the attachment ring portion 13 is formed into a sharp-angled or pointed shape and is substantially perpendicular to the axial direction. One or more ringed or continuous ridges 24 are formed on the inner surface of vertical wall portion 22, along the circumferential direction thereof. A plurality of such ridges can be used as well. Further, the section of ridge 24 is of a tapering, triangular shape, with the optimal width of the base and height both being 1-2 mm. The sectional shape of ridge 24 may also be a trapezoid or a semi-circle.

Further, a flange-like part 25 bent outwardly in the radial direction is formed at the outer end portion of attachment ring portion 13.

Figure 2:
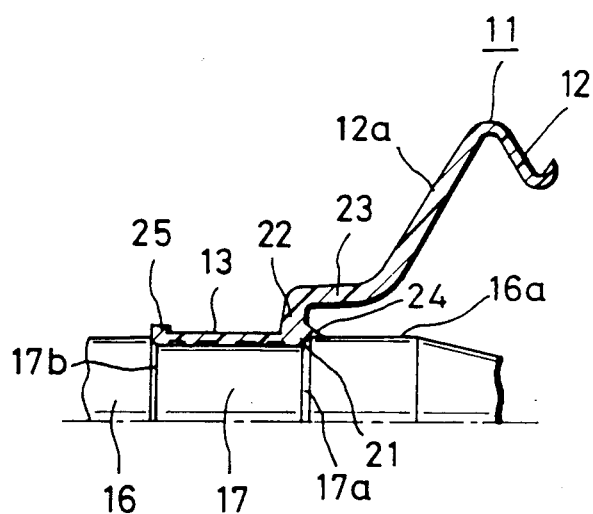
FIG. 2 is a half-sectional view showing the principal part of a second embodiment of the small diameter attachment ring portion of the dust boot of the present invention.

FIG. 2 shows the second embodiment of ring portion 13. The structure of this second embodiment is the same as that of the aforementioned first embodiment except for the position of ringed the ridge 24, the ridge 24 being formed on surface 16a, which is adjacent to locking groove 17, of joint shaft 16.

Figure 3:
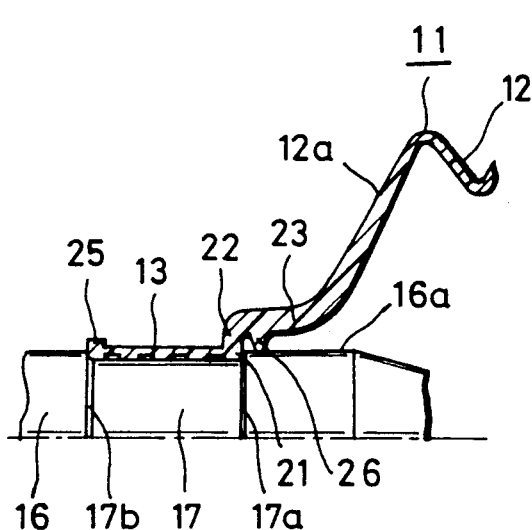
FIG. 3 is a half-sectional view showing the principal part of a third embodiment of the small diameter attachment ring portion of the dust boot of the present invention.

FIG. 3 shows the third embodiment of ring portion 13. According to this embodiment, ringed ridge 26 is formed on and along the circumferential direction of the inner surface of sleeve portion 23, the formation of this ridge 26 being such that the end thereof directly contacts surface 16a, which is adjacent to locking groove 17, of the joint shaft 16.

Figure 4:
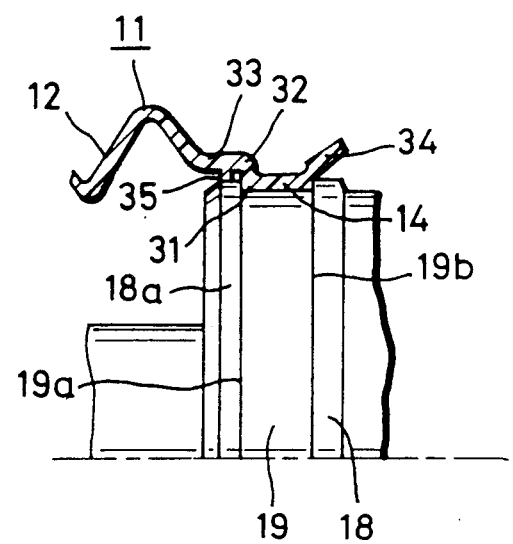
FIG. 4 is a half-sectional view showing the principal part of an embodiment of the large diameter attachment ring portion of a dust boot of the present invention.

FIG. 4 shows an embodiment of the attachment ring portion 14. In the same manner as attachment ring portion 13, attachment ring portion 14 has vertical or radial wall portion 32 at inner end portion 31 thereof; sleeve portion 33 extending from the vertical wall portion 32 to accordion-shaped portion 12; and flange-like portion 34 at the outer end thereof. Ringed ridge 35 is formed on the inner surface of the sleeve portion 33, along its circumferential direction, the formation of the ridge 35 being such that the end thereof directly contacts surface 18a, which is adjacent to locking groove 19, of rack housing 18.

Figure 9:
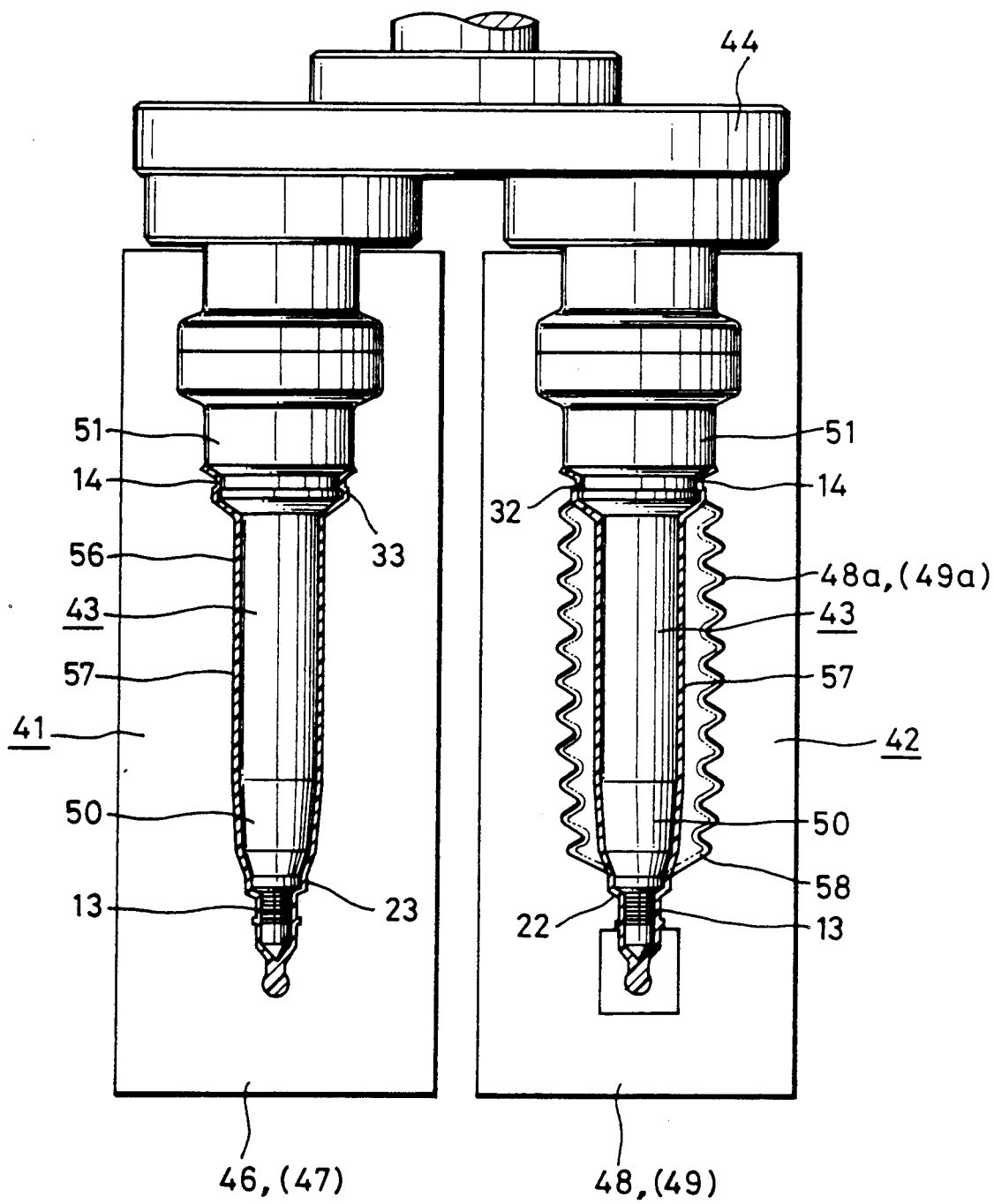
FIG. 9 is a side view of a molding device and illustrates the method for making a synthetic resin dust boot according to the present invention.
Figure 10:
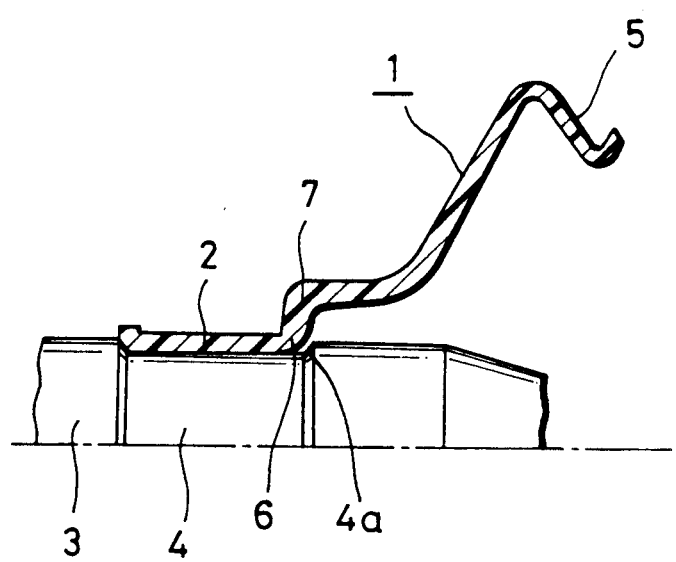
FIG. 10 is a half-sectional view showing the principal part of the small diameter attachment ring portion of a conventional dust boot.

Next, an embodiment of the method for making the dust boot 11 will be given hereunder referring to FIGS. 5, 6 and 9, the method according to this embodiment utilizing injection blow molding.

Firstly, the structure of the molding device will be given with reference to FIG. 9.

The molding device comprises cavity metal mold 41 for parison molding; cavity metal mold 42 for blow molding; a pair of core metal molds 43, which revolve between the two cavity metal molds 41 and 42; and revolving core supporting base 44 coupled to the core rotating device, which rotates the core metal molds 43. The cavity metal mold 41 for parison molding comprises a pair of easily opened, easily closed molding members, namely movable cavity member 46 for parison molding and fixed cavity member 47 for parison molding. The cavity metal mold 42 for blow molding comprises a pair of easily opened, easily closed molding members, namely movable cavity member 48 for blow molding and fixed cavity member 49 for blow molding. Each of the core metal molds 43 includes shaft-like core 50, which is a molding member connected to the core supporting base 44 and outer cylinder 51, a molding member fitted on the top of the core 50. Further, although not shown in the figure, the core metal molds are provided with air blow-off ports.

Figure 5:
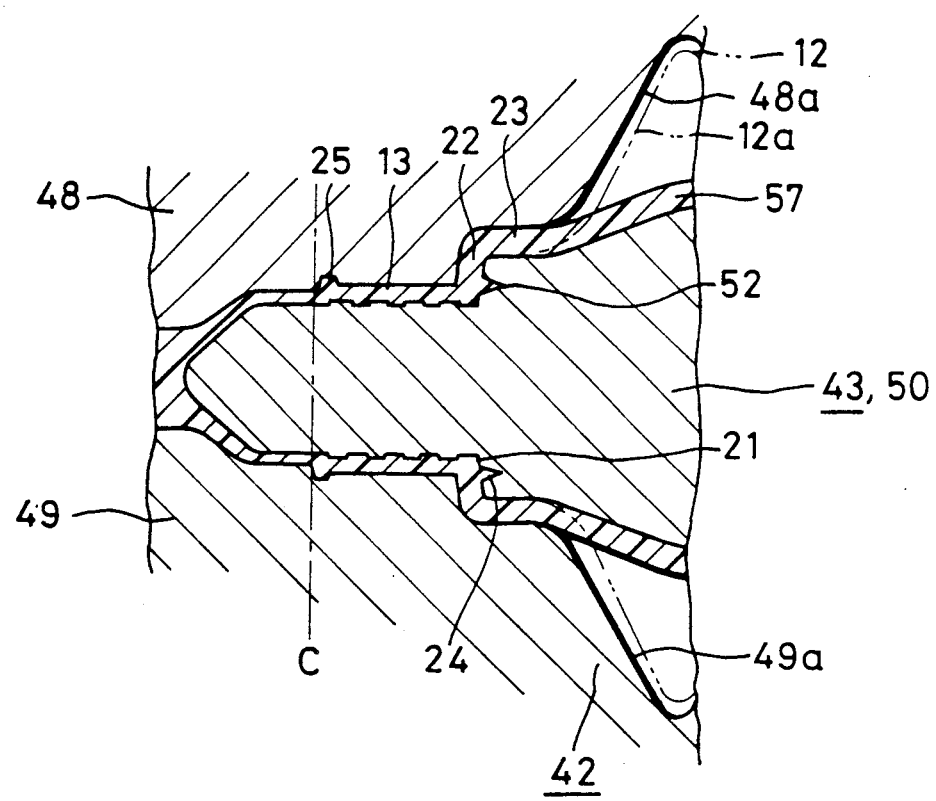
FIG. 5 is a partial sectional view showing blow molding of the small diameter attachment ring portion of the first embodiment.

As shown in FIG. 5, ringed groove 52 for molding the ridge 24 is formed at the end of the core 50 of core metal mold 43 to form attachment ring portion 13 along the circumferential direction. Also, a groove to mold the ridge 35 (not shown) is formed at the end of outer cylinder 51 of core metal mold 43 for molding of the attachment ring portion 14.

With the configuration as above, firstly, for the process of molding a parison, cavity metal mold 41 is closed, with the core metal mold 43 being wrapped by the cavity metal mold 41; and then molten thermoplastic synthetic resin is injected into cavity space 56 between core metal mold 43 and cavity metal mold 41. Thus, parison 57 is formed by injection molding. At the same time, attachment ring portion 13, vertical or radial wall portion 22 and sleeve portion 23 are molded. Also, inner end portion 21 of attachment ring portion 13 is molded substantially perpendicular to the axial direction, together with ringed ridge 24, which is formed along the circumferential direction on the inner surface of vertical wall portion 22 of inner end portion 21 of attachment ring portion 13 by means of groove 52 of core 50. Attachment ring portion 14, vertical or radial wall portion 32 and sleeve portion 33 are also formed between cavity metal mold 41 for parison molding and outer cylinder 51, as well as ridge 35 being formed on the sleeve portion 33.

Next, in order to proceed to the blow molding process, core metal mold 43, with parison 57 still adhering therearound, is moved from cavity metal mold 41, which has been opened, to the space between the pair of blow molding cavity members 48 and 49. Then, cavity metal mold 42 for blow molding is closed, containing therein core metal mold 43 with parison 57 therearound. Under the above condition, attachment ring portion 13, vertical wall portion 22 and sleeve portion 23 are sandwiched between core 50 and cavity members 48 and 49, as shown in FIG. 5, without space between them. Also, attachment ring portion 14, vertical wall portion 32 and sleeve portion 33 are sandwiched between outer cylinder 51 of core metal mold 43 and cavity members 48 and 49 without space between them. Then, compressed air is blown from the air blow-off port of core metal mold 43 between core metal mold 43 and parison 57. With the air blow, parison 57 is blown, except for its both end parts, and pushed against the inner surfaces of cavity members 48 and 49, namely cavity surfaces 48a and 49a, an accordion-shaped portion or belly 12 thus being formed.

Figure 6:
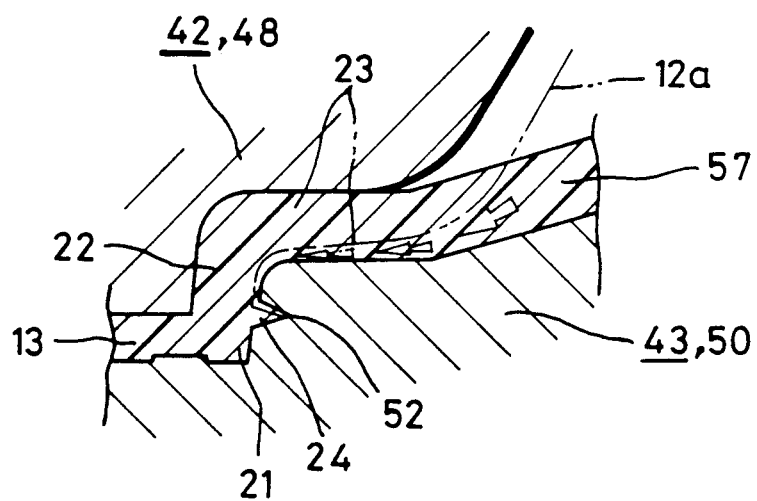
FIG. 6 is an enlarged sectional view of the ridge part shown in FIG. 5.
Figure 7:
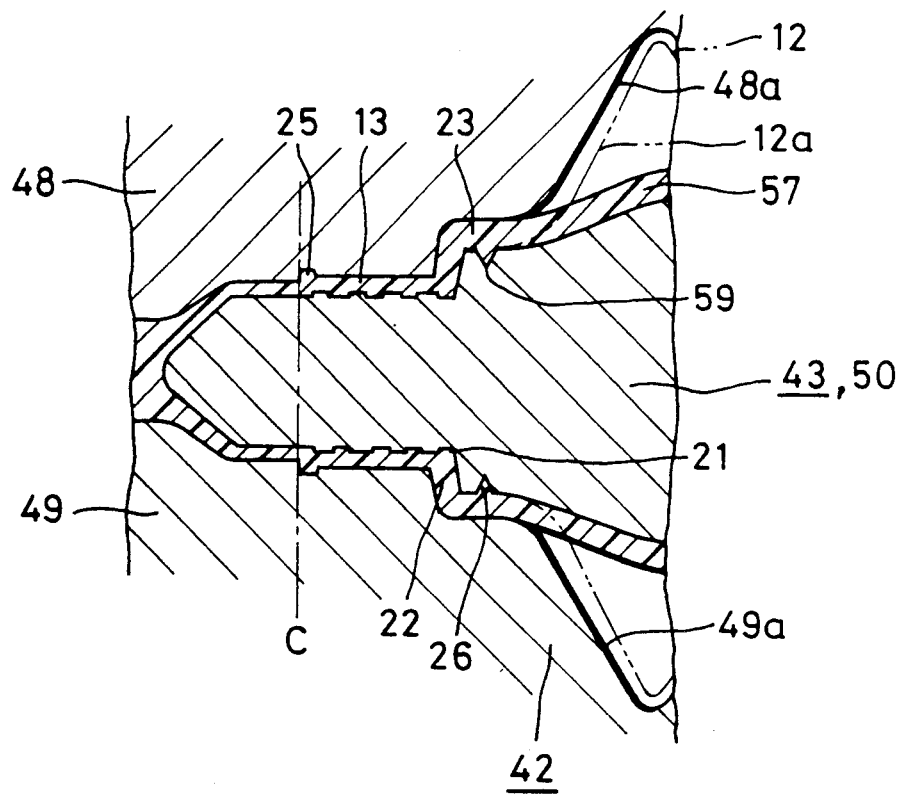
FIG. 7 is a partial sectional view showing blow molding of the small diameter attachment ring portion of the third embodiment.

At that time, as shown in FIG. 6, due to the pressure of the compressed air blown in, tension works on sleeve portion 23 and slope 12a of accordion-shaped portion 12 to reduce the thickness thereof, so that compressed air flows into the inner side of sleeve 23. However, flow of the compressed air into the inner side of attachment ring portion 13 is prevented, because ridge 24 on the inner surface of vertical wall portion 22 is locked with groove 52 of core 50. In other words, tapered ridge 24 is pushed against one surface of groove 52 of core 50, the surface shown as the lower surface in FIG. 6, by in-coming compressed air flowing in the direction shown with arrows, thereby preventing the compressed air from flowing beyond ridge 24. Therefore, the inner surface for attachment ring portion 13 is formed with its shape securely maintained to be that of the mold, without impairment or deviation from intended dimension. Also inner end portion 21 of attachment ring 13 is formed into a sharp-angled shape without being deformed, securely maintaining its substantially perpendicular disposition to the axial direction.

Attachment ring portion 14 is accurately formed in the same manner.

Next, after opening cavity metal mold 42, molded material 58 is removed from core metal mold 43 by means of a molded material removing device (not shown) and then cut at the line shown as the alternate long and short dash line 'C' in FIG. 5. Thus, dust boot 11 is produced.

FIGS. 5 and 6 show molding of the respective first and second embodiments of the attachment ring portion 13. Also in case of molding of the third embodiment of the attachment ring portion 13 shown in FIG. 7, by locking ridge 26 groove 59, possible deformation of attachment ring portion 13 is prevented during the blow molding step.

Although the methods of making the above embodiments call for injection blow molding, it is also possible to produce dust boot 11 by means of extrusion blow molding method. In this case, at the time of closing the mold for blow molding, attachment ring portions 13 and 14, vertical wall portions 22 and 32 and ridges 24, 26 and 35 are molded by means of compression molding, i.e. sandwiching the parison between the core metal mold and the cavity metal mold.

Procedures concerning application of thus produced dust boot 11 are explained hereunder:

As shown in FIG. 8, attachment ring portion 13 of dust boot 11 is installed in locking groove 17 of joint shaft 16, and then fastened with clip band 61. Attachment ring portion 14 is similarly installed in locking groove 19 of rack housing 18 and fastened with clip band 62.

As shown in FIGS. 1 through 4, inner end portions 21 and 31 of attachment ring portions 13 and 14 contact with catching surface 17a and 19a of the locking grooves 17 and 19 respectively, while the outer end portions of attachment ring portions 13 and 14 contact with catching surfaces 17b and 19b at the other ends of locking grooves 17 and 19. Inner end portions 21 and 31 of attachment ring portions 13 and 14 become securely engaged against catching surfaces 17a and 19a of locking grooves 17 and 19, because the inner end portions 21 and 31 are formed into a sharp-angled shape substantially perpendicular to the ring and the shaft axes. Therefore, and also because the size of the inner surface of attachment ring portions 13 and 14 are accurate, these attachment ring portions 13 and 14 will not easily be accidentally dislocated from locking grooves 17 and 19 and will be tightly sealed with joint shaft 16 and rack housing 18 respectively. Further, at the time of stretching and contracting operation of dust boot 11, no slippage of attachment ring portions 13 and 14 in the axial direction of joint shaft 16 or rack housing 18 can occur, and thus, abrasion of inner surfaces of attachment ring portions 13 and 14 is prevented.

As shown in FIGS. 2 through 4, if ridges 24, 26 and 35 are pressed against surfaces 16a and 18a of joint shaft 16 and rack housing 18 respectively, sealing tightness at the inner surfaces of attachment ring portions 13 and 14 will be further improved, thereby making the locking more secure.

Further, because of the positive catching action of inner end portions 21 and 31 with catching surfaces 17a and 19a of locking grooves 17 and 19, a technician or installer is able to feel and therefore to confirm completion of attachment of attachment ring portions 13 and 14 to locking grooves 17 and 19.

Furthermore, as described as above, because catching action of attachment ring portions 13 and 14 with locking grooves 17 and 19 is strong, it is possible to omit some parts, such as clip ring 61, thereby reducing steps of attaching procedures of dust boot 11.

The above embodiments employ a rack boot for the steering mechanism as an example of use of dust boot 11, but a dust boot according to the present invention is not limited to a rack boot. The shape of the belly portion of such dust boot is not limited to the accordion shape, but bell-like shape as well as others could be used.

The present invention has effects as described in the following:

As a synthetic resin dust boot 11 according to the invention has ringed ridges 24, 26, 35 formed on the inner surfaces of the vertical wall portions 22, 32 and on the inner surfaces of the sleeve portions 23, 33, and as each of the inner end portions 21, 31 is formed into a sharp-angled shape substantially vertical to the axial direction, the attachment ring portions 13, 14 become positively and securely caught and locked with the locking grooves 17, 19 of the receiving shafts 16, 18. They do not come off accidentally, and therefore sufficient sealing ability can be obtained. As attachment of the attachment ring portions 13, 14 into the locking grooves 17, 19 can be felt when completed, a mechanic is able to easily confirm whether the attachment properly has been made. As described as above, because attachment action of the attachment ring portions 13, 14 to the locking grooves 17, 19 is substantially strong, it becomes unnecessary to the provide locking grooves 17, 19 with stoppers to prevent slippage and thus, the number of steps of attaching procedures of dust boots 11 can be reduced. Moreover, sealing ability can be further improved by pressing the ridges 24, 26, 35 against the outer surfaces of the receiving shafts 16, 18.

As the method for producing dust boot 11 calls for molding ridges 24, 26, 35 together with attachment ring portions 13, 14 at the time of parison 57 molding or closing the molds for blow molding, and then blow-molding the belly portion 12 while sandwiching the ring portions 13, 14 and the sleeve portions 23, 33 between the molding members 48, 49, 50, 51, the flow of compressed air for blow molding into the inner sides of the attachment ring portions 13, 14 is prevented. This is done by the blocking presence in grooves 52, 59 of the ridges. Therefore, it is possible to mold the attachment ring portions 13, 14 with accurate measurements without deforming them and also to mold each of the inner end portions 21, 31 of the attachment ring portions 13, 14 into an upright, sharp-angled shape.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for providing a dust-proof boot for a protruding equipment shaft;

said equipment shaft including at least one annular groove;

said boot including at least one attachment ring portion adapted to be received in said equipment shaft groove, an expandable belly portion, and a connecting portion connecting said attachment ring portion and said belly portion;

at least one of said attachment ring portion and said connecting portion including an inwardly protruding annular ridge member;

said method comprising the steps of:

providing a parison, said parison including a preformed attachment ring portion and connecting portion;

providing a male die and a female blow-molding die;

inserting said parison between said male die and said female die, with said attachment ring portion and said connecting portion captured and supported therebetween, said ridge member being received in a mating groove in said male die;

introducing compressed gas between said parison and said male die to urge a portion of said parison radially outwardly against said female die;

said compressed gas urging said ridge member into sealing relation with a wall portion of said groove in said male die, whereby passage of said compressed gas between said preformed attachment ring portion and said male die is prevented.

2. A method for providing a dust-proof boot for a protruding equipment shaft;

said equipment shaft having a pair of spaced apart annular grooves;

said boot comprising an expandable central belly portion, a pair of restricted diameter attachment ring portions adapted to be received in said equipment shaft grooves, and a pair of connecting portions connecting said attachment ring portions to said belly portion;

said method comprising the steps of:

providing a male die and a female blow-molding die;

forming a parison on said male die, said parison including preformed attachment ring portions and connecting portions, at least one of each attachment ring portion and adjacent connecting portion including an inwardly protruding annular ridge member, said ridge members being received in mating recesses in said male die;

inserting said male die and said parison into said female die with said preformed attachment ring portions and connecting portions caught and supported between said male die and said female die;

introducing compressed gas between said parison and said male die to blow mold said belly portion against said female die;

said compressed gas urging said ridge members into sealing relation with wall portions of said grooves in said male die, whereby passage of said compressed gas between said preformed attachment rings and said male die is prevented.

* * * * *